United States Patent [19]
Damewood

[11] 3,851,869
[45] Dec. 3, 1974

[54] ROTATABLE CHUCK FOR SUPPORTING ELONGATE WORK PIECE

[75] Inventor: Marvin L. Damewood, Knoxville, Tenn.

[73] Assignee: W. J. Savage Co., Inc., Knoxville, Tenn.

[22] Filed: July 18, 1973

[21] Appl. No.: 380,372

[52] U.S. Cl.................. 269/61, 269/104, 269/127, 269/129
[51] Int. Cl............................................. B23g 1/16
[58] Field of Search ........ 279/1 R; 269/57, 61, 126, 269/127, 128, 129, 287; 82/38, 39, 40 A, 4 C

[56] References Cited
UNITED STATES PATENTS

| | | | |
|---|---|---|---|
| 2,577,277 | 12/1951 | Schulz et al. | 82/39 |
| 3,038,734 | 6/1962 | Else | 279/1 R |
| 3,521,875 | 7/1970 | Kapelsohn | 269/287 X |

Primary Examiner—Gil Weidenfeld
Attorney, Agent, or Firm—Burns, Doane, Swecker & Mathis

[57] ABSTRACT

A chuck for holding a piece of work during a sawing operation. The work accommodated may be of any desired shape and of a size from about 12 inches to about 40 inches in diameter. The chuck includes a segmental ring mounted for rotation and carrying jaws with work holders that engage the work on different sides to hold it in place during the cutting operation. The segmental ring includes a section pivotally mounted so as to be opened for introducing the work through the open top into the chuck. Bearing means are provided for rotation of the segmental ring, including tracks and spaced rollers. Locking devices are provided for holding the segmental ring and jaws in fixed positions.

9 Claims, 5 Drawing Figures

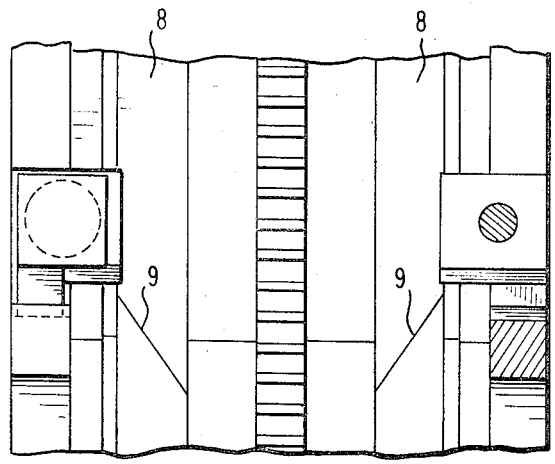
FIG. 3
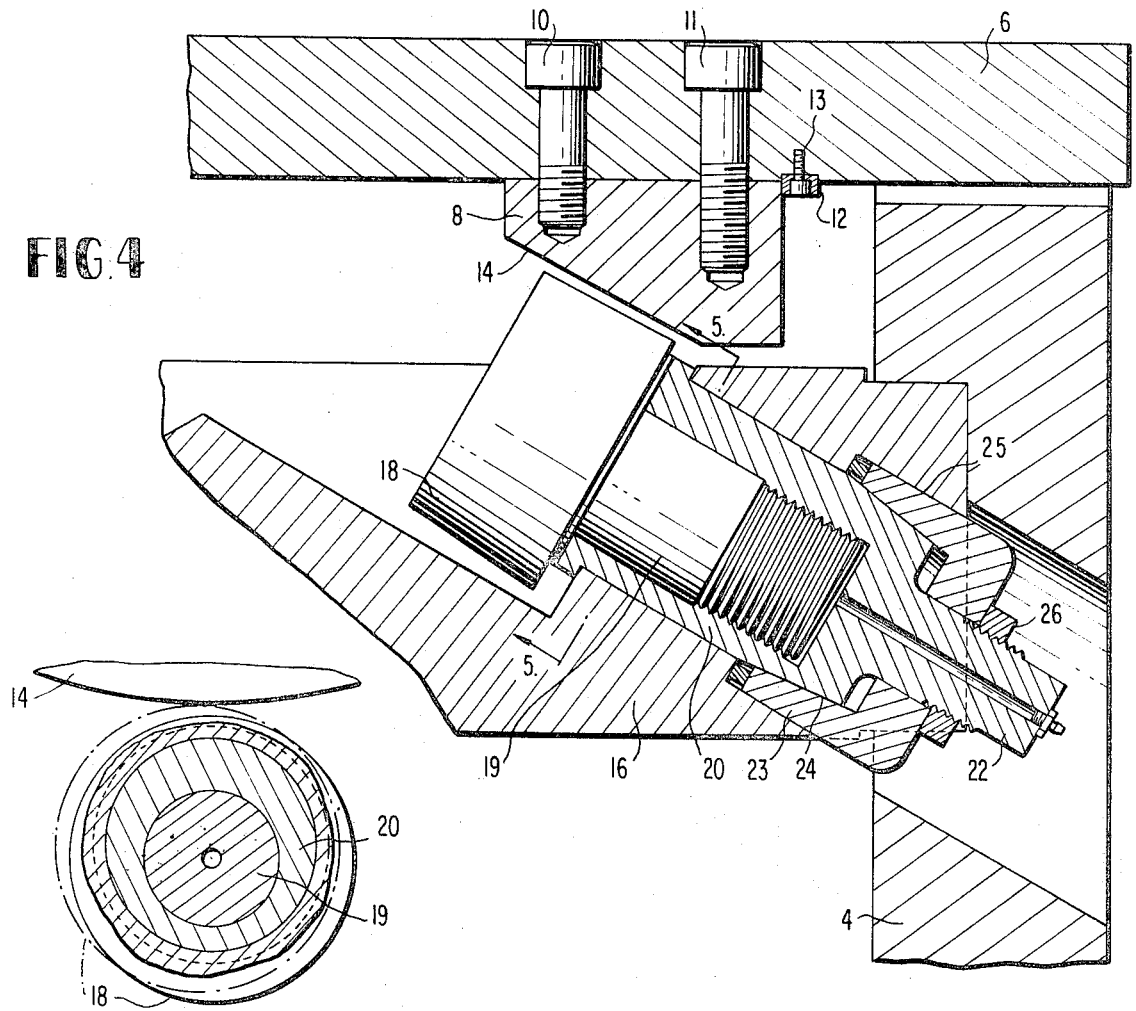
FIG. 4
FIG. 5

ROTATABLE CHUCK FOR SUPPORTING ELONGATE WORK PIECE

SUMMARY OF THE INVENTION

This invention relates to improvements in chucks of the character used for holding large pieces of work during a sawing operation. It is preferred that the chuck be constructed of a size and character so as to accommodate work of the order of twelve to forty inches in diameter.

Machines of the character used for cutting work of the size and character mentioned usually employ abrasive wheels or blades for the cutting operation. Frequently, such machines provide for the rotation of the work during the cutting operation. In any event, work of the size mentioned is heavy and cumbersome and when manipulation is required, the supporting chuck must be heavy in construction and sufficiently sturdy to support the work during the cutting operation as well as manipulating it when required.

It is frequently desirable to mount the chuck on a trackway so as to permit it to hold the work at the end thereof opposite from that undergoing the cutting operation. When so mounted, the chuck in its supporting relation to the work may be moved bodily with the work in feeding the latter to the blade or to another type of forming operation.

In handling large pieces of work of the type mentioned, it has been difficult heretofore to insert the work in the chuck and to secure it rigidly in place therein. Usually, such chucks have required that the work be inserted axially through a central opening in the chuck. This is cumbersome and difficult especially with very heavy and large pieces that must be inserted into spaced aligned chucks or holder members.

One object of this invention is to simplify and improve chucks of the character used for handling large pieces of work to facilitate the insertion and removal of the work therefrom and the effective securing of the work in place in the chuck.

Another object of the invention is to provide a chuck capable of receiving and securing pieces of work of large size, which chuck has a top which is capable of being opened for insertion and removal of the work through the open top and when in place, the chuck will effectively and securely hold the work during the operation thereon.

Another object of the invention is to provide an open top chuck wherein the jaws are capable of rotation to present the work in proper relation to the means for operation thereon. The open top forms a continuation of the surrounding jaw structure so as to aid in maintaining the holding relation with the work.

These objects are accomplished according to one embodiment of the invention by providing a segmental ring mounted for rotation and preferably having power means for effecting the rotation thereof. The segmental ring is made with a top section mounted for swinging movement to an open position for insertion of the work through the open top, after which the top section is closed. Jaws on the inner surface of the ring have slide members in positions for engaging the periphery of the work on different sides thereof so as to maintain the work properly centered in the chuck. Suitable locking means is provided not only for the top section of the chuck, but also for orienting the holding means with respect to the work.

BRIEF DESCRIPTION OF THE DRAWINGS

This embodiment of the invention is illustrated in the accompanying drawings, in which

FIG. 3 is a detail side elevation, partly in section, on the line 3—3 in FIG. 1;

FIG. 4 is an enlarged detail cross section through the track and one of the supporting rollers; and FIG. 5 is a cross section therethrough on the line 5—5 in FIG. 4.

DETAILED DESCRIPTION OF DISCLOSURE

Figure 1:
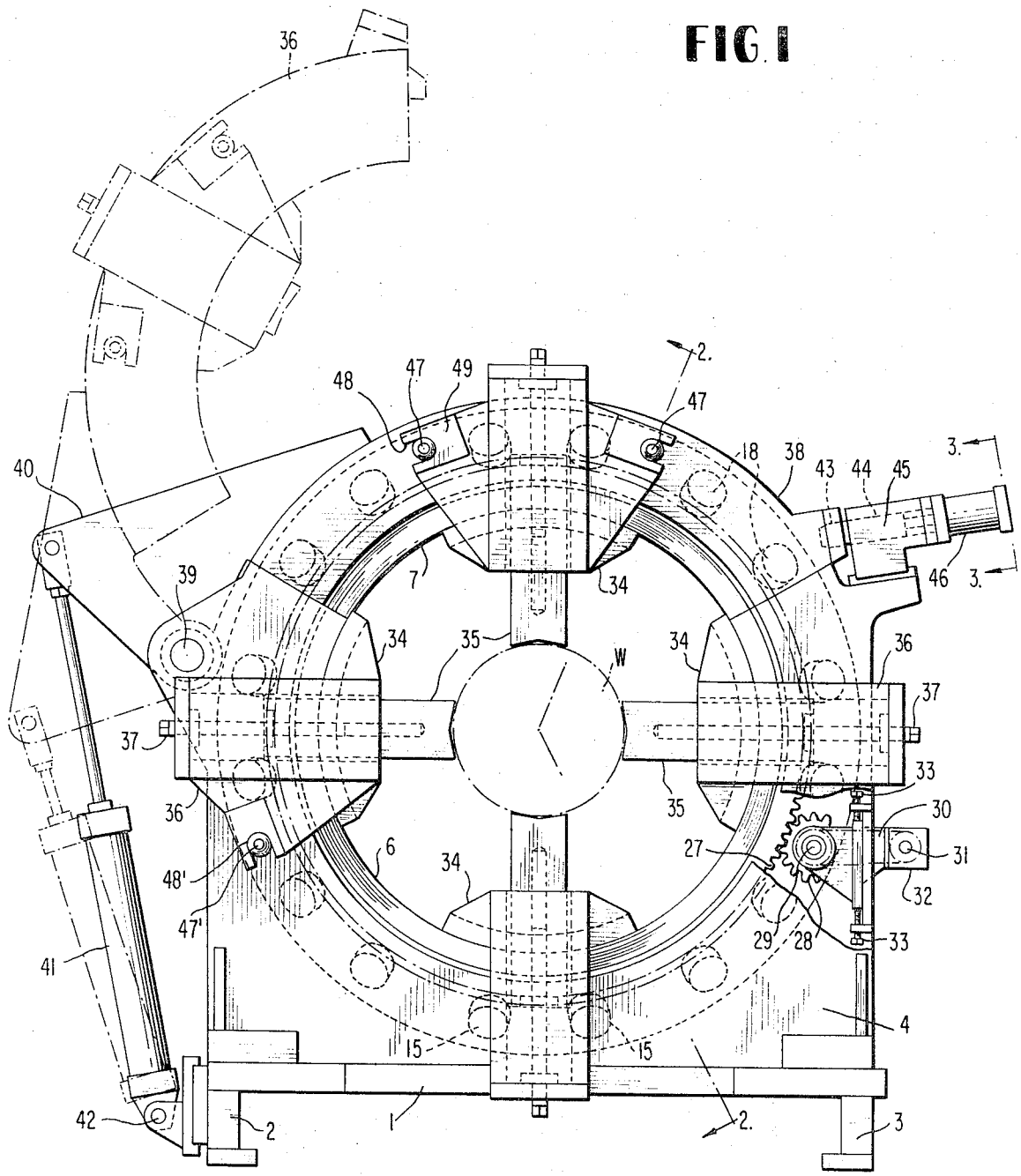
FIG. 1 is a side elevation of the chuck, also showing the top section in open position.
Figure 2:
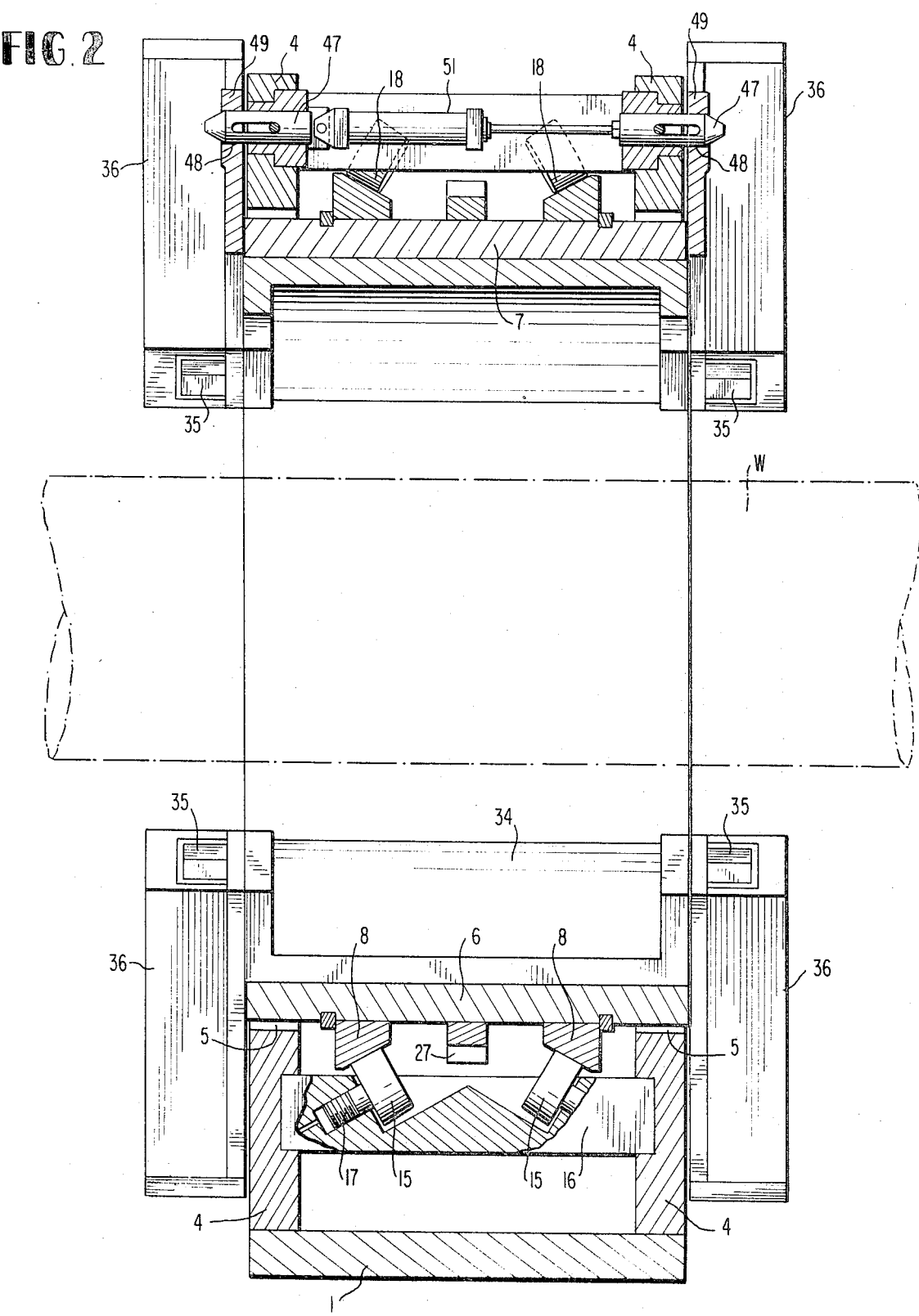
FIG. 2 is a vertical cross section therethrough on the line 2—2 in FIG. 1.

The work W, shown in FIGS. 1 and 2, is illustrated as an elongated piece of steel of circular cross section and may be of the order of from 12 to 40 inches in diameter. This configuration is typical of work pieces that may be handled by the chuck of this invention, but the shape of the work can be varied as desired. For example, the work piece can be oval, rectangular or even of irregular cross section and may be accomodated by this invention.

In cutting or forming a piece of work of the character described, it is often desired to support it at one end in a chuck, while the opposite end is secured in a work holder within the forming machine. The chuck should have provisions for holding the work securely at the outer end portion thereof and may be mounted for feeding movement along a base or trackway toward the point of cutting or forming.

In the chuck illustrated, a base 1 extends from side-to-side of the chuck, and, if it be desired to mount this on a trackway, it may be provided at opposite edges thereof with track engaging slide members 2 and 3. Mounted on the base 1 and upstanding therefrom are standard end plates 4 which are spaced apart axially of the chuck, as illustrated in FIG. 2. These end plates 4 are secured rigidly upon the base 1 and are mounted in spaced parallel relation. Each of the end plates 4 has a central opening 5 therein, with the openings 5 in axial alignment with each other.

A segmental ring is formed of sections 6 and 7 which fit together to form a composite cylinder. This segmental ring 6–7 extends at opposite ends through the axial openings 5 in the end plates 4. The segmental ring 6–7 is supported on axially spaced rollers disposed about the periphery thereof.

As shown particularly in FIGS. 2 and 4, the ring 6–7 has tracks 8 extending about the periphery thereof terminating at the ends of the respective segments or the sections of the ring, but formed with angular joints between these sections, as illustrated at 9 in FIG. 3. Each track 8 is secured at intervals along its length by bolts 10 and 11 (FIG. 4) and is also braced laterally at its outer edge by a holding ring 12 which fits into a groove in the periphery of the segmental ring and is anchored thereto by screws 13 (FIG. 4).

The outer peripheries of the tracks 8 are formed by bevelled surfaces 14 for mounting on the supporting rollers in guided relation with the latter. As will be apparent from FIG. 2, the track surfaces 14 of the respective tracks 8 are bevelled in converging relation at obtuse angles to each other, thus tending to hold the segmental ring 6–7 properly centered with respect to the rollers. Two sets of rollers are provided, one for each of the track surfaces 14 on its track 8 and these are spaced apart around the periphery of the segmental ring 6, as described, and as also illustrated in FIG. 1.

Two pairs of axially aligned rollers at the bottom of the standard 4 are illustrated at 15 in FIGS. 1 and 2. Each of the rollers 15 is mounted in a fixed position in a supporting block 16 in the form of a ring and extending in bridging relation between the inner faces of the upright end plates 4. Each of the rollers 15 is shown as provided with a mounting stem 17 for supporting it within the bracket 16 and, in the illustrated embodiment, this pin 17 is screw threaded in the bracket for axial adjustment of the roller with respect to the track surface 14. The peripheral surface of the roller should be tangent throughout its width to the bevelled surface 14 of each of the tracks 8.

Spaced at intervals around the periphery of the segmental ring 6–7 are adjustable rollers 18, all of the rollers except those four indicated at 15 being adjustable as herein described. Each of the rollers 18 has its periphery tangent to the surface 14 on one of the tracks 8 throughout the width of the roller and along the circumference thereof above the four rollers 15. This surface, like the surface of each roller 15, may be cylindrical or somewhat frusto-conical to effect this relation and to maintain a proper supporting turning movement of the ring with respect to the series of rollers 15–18. This contact relation is effectively accomplished by an adjustable mounting for each roller 18 so as to move the periphery thereof toward or from the contact surface 14.

In the illustrated embodiment of the invention, each roller 18 has a mounting pin 19 supporting the roller in journaled relation thereto. The pin 19 extends into an eccentric bushing 20 (FIGS. 4 and 5) and may be threaded therein or otherwise fastened for secure mounting.

The pin 19 is mounted eccentrically of the bushing, which latter extends into and is supported by the mounting block 16 extending between the end plates 4. The eccentric sleeve 20 has a dependent end portion 22 surrounded by a collar 23 which has a tapered fit at 24 over the adjacent end of the bushing 20 and extends into a recess 25 in the mounting block 16, thus forming a wedging connection between the end of the bushing 20 and the mounting block.

A nut 26 is threaded over the dependent end 22 of the bushing and against the outer end of the collar 23 to force the latter into locking engagement with the tapered end of the bushing. When the nut 26 is loosened so as to allow the collar 23 to be backed off from its wedging connection, the entire eccentric bushing can be rotated to adjust the position of the roller 18 toward or from the adjacent surface 14 of the track 8. When a proper tangent relation is obtained therebetween the nut 26 can be tightened so as to move the collar 23 into tight wedging relation, thus maintaining the bushing securely in place in the mounting block 16 and thereby holding the roller 18 in proper position for operation. Each of the rollers 18 around the circumference of the segmental ring 6–7 can be adjusted individually in the manner described.

The segmental ring 6–7 is provided with suitable means for effecting rotation thereof upon the rollers 15–18. In the embodiment illustrated, this means is in the form of a circumferential gear 27 (FIGS. 1 and 2) in mesh with a drive pinion 28 mounted on a drive shaft 29. This drive shaft 29 may be provided with any suitable power means, such as a hydraulic motor, for effecting rotation thereof and thereby driving the segmental ring.

Also in the embidment illustrated, suitable means is provided for effecting proper adjustment between the periphery of the pinion 28 and the gear 27. The pinion 28 and its shaft 29 are mounted on one end of an arm 30, the opposite end of which is pivoted at 31 in a bracket 32 secured between the end plates 4. Suitable adjusting means, such as screws 33, bearing against opposite sides of the arm 30, may be used to effect vertical swinging movement of the arm about its pivot 31, thereby adjusting the mesh of the pinion 28 with respect to the gear 27.

The segmental ring 6–7 is provided at intervals around the inner circumference thereof with jaws 34, of which four are shown at 90° to each other. Three of the jaws 34 are provided on the lower section 6 of the segmental ring and one jaw 34 is provided on the upper section 7 thereof. Each of these jaws 34 may be bolted or otherwise secured rigidly to the inner circumference of the ring. These jaws will serve to hold the work W in the larger sizes thereof.

Work holder members are also shown at 35 in slidable relation with boxes 36 mounted on the lateral edges of the ring 6–7 and secured in rigid relation thereto as by welding, bolting or the like. The holding members 35 may be adjusted in and out manually, as by screw feed means shown at 37. The holder members 35 may be adjusted into peripheral bearing relation with the work W to hold the latter securely in place axially of the ring. Thus, upon rotation of the ring 6–7, the work will be turned, when desired, with respect to the sawing or working means.

The top section of the chuck is adapted to be opened, as indicated in dotted lines in FIG. 1. This is accomplished by using a segmental standard section 38 which extends around the upper portion of the ring 6–7 and supports the mounting rollers 18 in the upper segment thereof. The top section 38, formed by the standard end plates 4, is pivotally mounted at 39 upon the lower portion of the standard so as to permit of this opening movement, as indicated in dotted lines in FIG. 1. An arm 40, mounted on the top section 38 of the standard and secured rigidly thereto, extends outwardly above the pivot 39 in FIG. 1 for attachment thereto of one end of a hydraulic power device, such as a cylinder 41, the opposite end of which is connected at 42 to the base 1 as, for example, by being attached to the slide member 2.

At the opposite end of the top section 38, means is provided for locking this top section in closed relation with respect to the standard 4. In the illustrated form, the free end of the top section 38 has recesses 43 adjacent opposite sides thereof, in position to receive therein pins 44 slidably mounted in brackets 45 located on the bottom section of the standard 4. Hydraulic cylinders are illustrated at 46 as a suitable means for reciprocating the pins 44 into and out of engaging relation with the recesses 43 and for holding the pins normally in engagement therewith during operation of the chuck.

It will be evident that the pins 44 may be retracted to release the top section 38 for raising movement to the dotted line position illustrated in FIG. 1. Upon release of the pins 44, the hydraulic cylinders 41 may be operated to cause this swinging movement of the top section.

I have also shown means for locking the segmental ring and the jaws in a fixed position with respect to the standard 4 to prevent rotation thereof when desired. This may be accomplished by a plurality of pairs of aligned pins, one pair being illustrated in FIG. 2. The pins are illustrated at 47, shown as entering into openings 48 in brackets 49 at opposite sides of the boxes 36. Each of the pins 47 is slidable through the side plate 4 forming the pedestal and is longitudinally slotted to receive a pin 50 so as to limit the endwise reciprocating movement of the pin 47.

The pins 47 are interconnected by a hydraulic cylinder 51 so as to engage or release the pins. It will be evident from FIG. 2 that upon energizing of the cylinder 51, first one of the pins then the other will be withdrawn.

There are two such pairs of pins 47 in the top segment 38 and one pair of pins 47' in the bottom segment corresponding in function and operation with the pair of pins illustrated in FIG. 2. The openings 48' are the pedestal plates 4 are circular openings so that upon entry of the pins therein, the structure will be locked, but the openings 48 in the brackets 49 of the top segment 38 are in the form of open ended notches so as to permit engagement upon circumferential movement of the ring 6–7.

It will be apparent that when the pins 47 and 47' are withdrawn, the segmental rings 6–7 may be rotated, as described. It may be operated at slow speed, with the pins withdrawn, until the next pin is engaged by the open ended slot 48 and, when this is engaged, the ring will be locked in place and held also by both pairs of pins 47 and the pair of pins 47'.

The operation of the chuck will be evident from the foregoing description. It will be apparent that the top section can be opened, as illustrated in dotted lines in FIG. 1, to receive the work therein upon the jaws 34 or 35, according to the size and shape of the work. The top section 38 then can be closed by the operation of the hydraulic cylinder 31 and will be locked in closed relation by the pins 43 under the action of the hydraulic cylinders 46. With this part closed and the top jaws moved into proper relation with the work W, the segmental ring 6–7 can be rotated just enough to bring the aligned sets of pins into locking relation with the pedestal between the top sections 4 and 38 and thereby secure the work for operation thereon.

When it is desired to rotate the work, the pins 47 and 47' can be withdrawn. Then by operation of the shaft 29, the gearing 27–28 will cause rotation of the segmental ring 6–7 and effect turning of the work with respect to the cutting means or other working means applicable thereto.

It is possible, according to this invention, to enter the work through the top of the chuck, which enables the work piece to be handled by a crane or other lifting means in moving it into and out of the chuck and with respect to the cutter or other operating means. Nevertheless, when the work piece is in place in the chuck, it is anchored securely and can be fed effectively to the operating machine. It is possible to handle large pieces of work of the order of from 12 to 40 inches in diameter and either cylindrical or of other shape, as desired.

While the invention has been illustrated and described in one embodiment, it is recognized that variations and changes may be made therein without departing from the invention as set forth in the claims.

I claim:

1. A chuck for an elongated work piece, comprising a support, a ring mounted on the support, means on the ring including jaws mounted for engagement with the work piece, said ring including a body portion and segment detachably mounted thereon for opening movement with respect to the body portion of the ring for insertion and removal of a work piece in the ring, and means carried by said support for circumferentially engaging and supporting the body portion and the segment of the ring for rotation relative thereto, at least a portion of said engaging and supporting means being adjustable radially of the ring, and means independent of the engaging and supporting means for driving said ring in rotation.

2. A chuck according to claim 1, including a movable support section having the ring segment mounted thereon, means operatively connected with the support section for opening and closing the ring segment, and means connected with the support section for securing the ring segment in closed relation with respect to the body portion of the ring.

3. A chuck according to claim 1, including at least one track secured to the periphery of the ring, each track having a peripheral bearing surface, and the radially adjustable means including circumferentially spaced rollers on the support in bearing relation with each track bearing surface and mounting the ring for rotation.

4. A chuck according to claim 3, wherein each track includes a body portion extending throughout the circumference of the ring body portion and a segment extending throughout the length of the ring segment.

5. A chuck according to claim 4, wherein each track body portion and track segment have overlapping ends providing a substantially continuous bearing surface.

6. A chuck for an elongated work piece comprising a support pedestal including upright side plates having a support section pivotally mounted thereon for swinging movement to an open position to receive a work piece in the chuck, a ring extending between the end plates including a body portion and a segment, bearing means carried by the side plates and support section and mounting the ring thereon for turning movement about an axis, work holding means carried by the ring for supporting the work in the chuck, at least a portion of said bearing means being adjustable radially of the ring, and means independent of the bearing means for driving said ring in rotation.

7. A chuck according to claim 6, wherein the ring has one or more tracks on the periphery thereof, each track including a body portion secured to the body portion of the ring and a segment secured to the segment of the ring, the track having an outer bearing surface, and rollers spaced circumferentially of the ring and mounted on the support pedestal for supporting the ring and the work during rotary movement.

8. A chuck for an elongated work piece comprising a support pedestal including upright side plates having a support pedestal including upright side plates having a support section pivotally mounted thereon for swinging movement to an open position to receive a work piece in the chuck, a ring extending between the end plates including a body portion and a segment, bearing means carried by the side plates and support section and mounting the ring thereon for turning movement about an axis, work holding means carried by the ring for supporting the work in the chuck, a pair of tracks spaced apart axially and having peripheral converging bearing surfaces, and rollers spaced apart circumferentially of the ring in positions for bearing relation with the surface of each track.

9. A chuck according to claim 8, including means for adjusting at least some of the rollers toward and from the adjacent track surface.

* * * * *